UNITED STATES PATENT OFFICE.

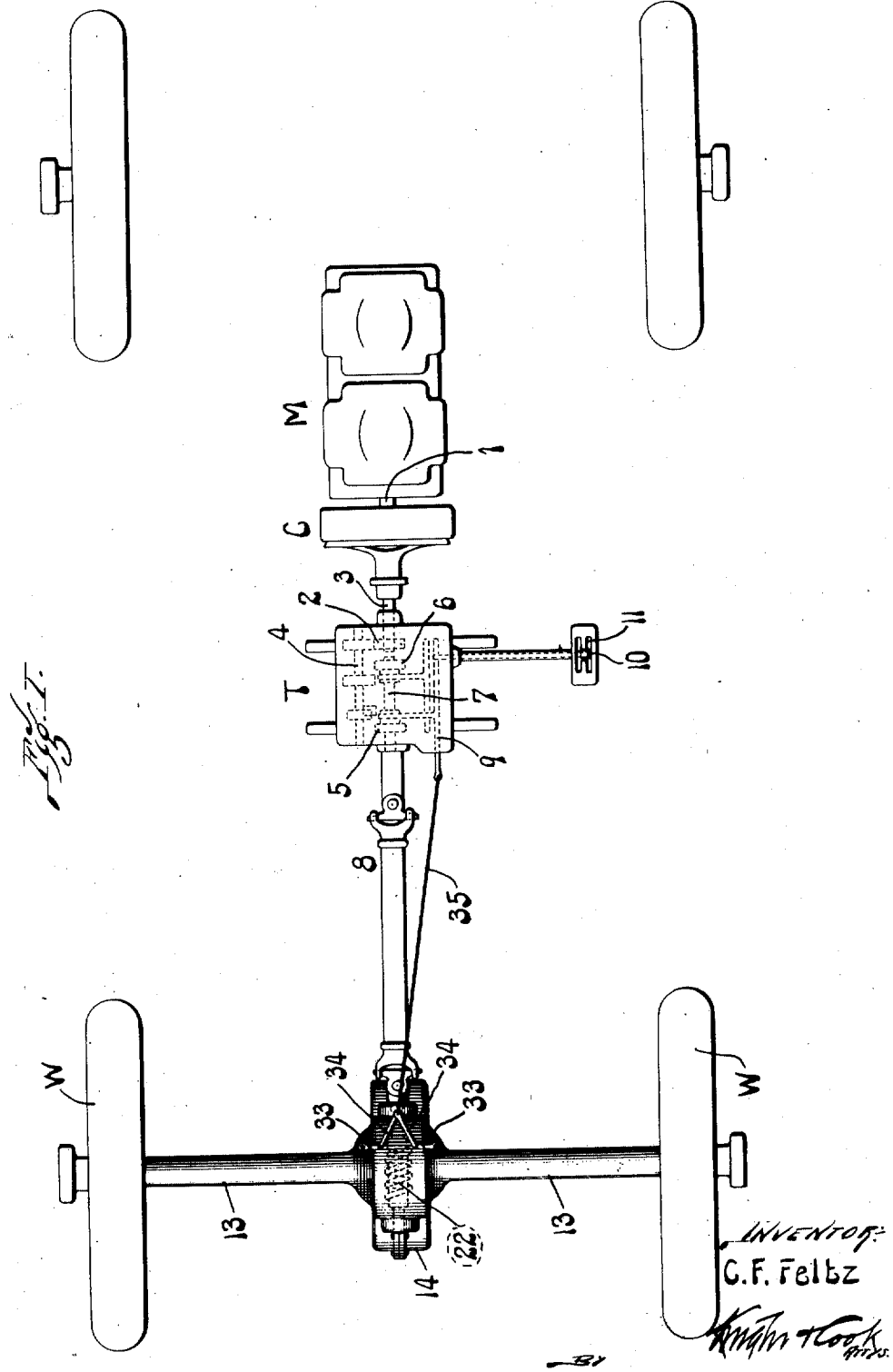

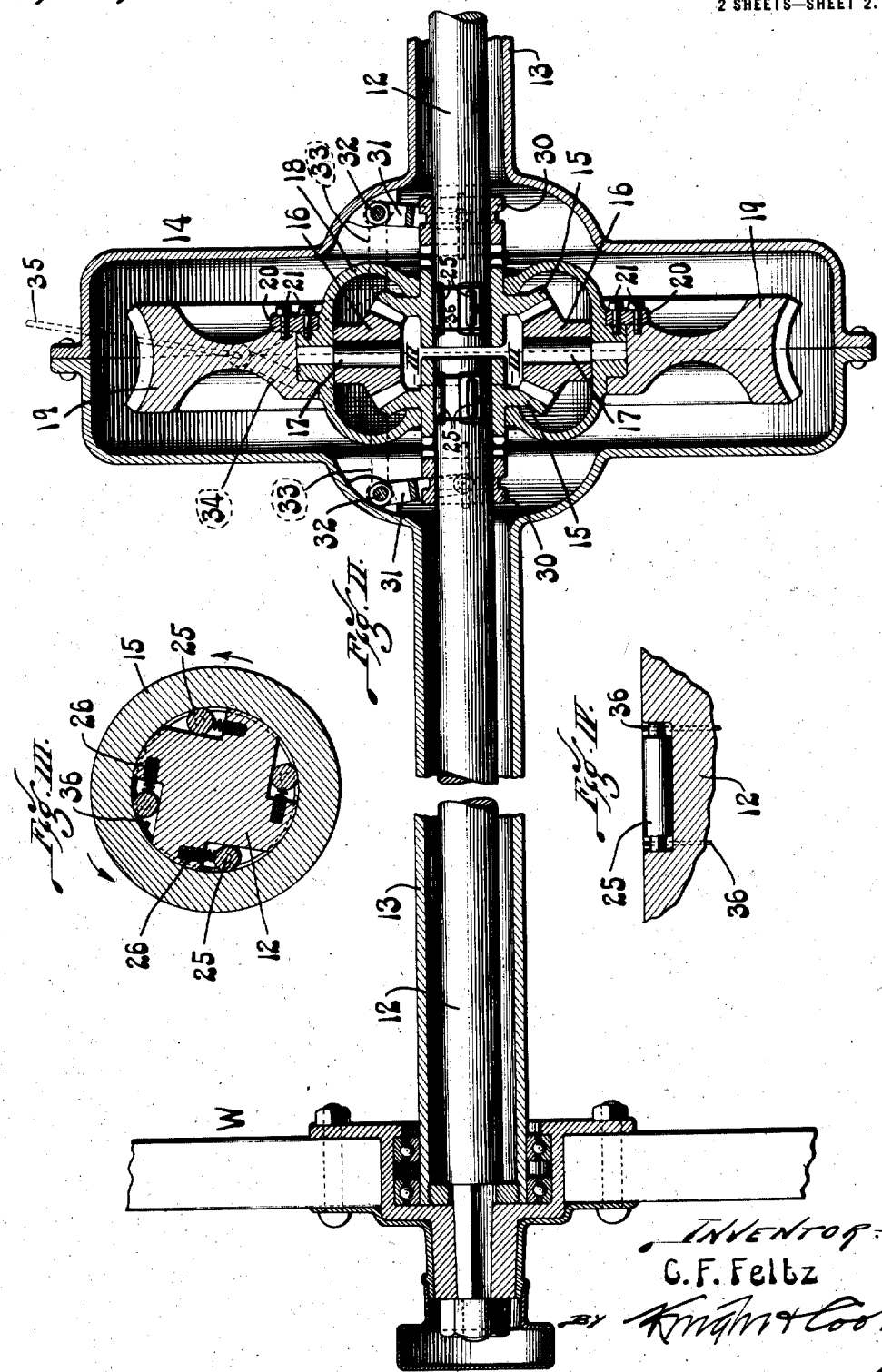

CHARLES F. FELTZ, OF ST. LOUIS, MISSOURI, ASSIGNOR OF ONE-FOURTH TO WM. E. ANDERSON, ONE-FOURTH TO WM. H. LANGDALE, AND ONE-FOURTH TO STONAY L. LANGDALE, ALL OF ST. LOUIS, MISSOURI.

MOTOR-DRIVEN VEHICLE.

1,228,009. Specification of Letters Patent. Patented May 29, 1917.

Application filed February 28, 1916. Serial No. 80,997.

*To all whom it may concern:*

Be it known that I, CHARLES F. FELTZ, a citizen of the United States of America, a resident of the city of St. Louis, State of Missouri, have invented certain new and useful Improvements in Motor-Driven Vehicles, of which the following is a full, clear, and exact description, reference being had to the accompanying drawings, forming a part of this specification.

My invention relates to improvements in motor vehicles, one of the objects being to produce a simple and inexpensive driving mechanism including a motor and transmission gearing for operating the traction wheels, and an overrunning clutch device the elements of which are free to allow the traction wheels to turn at an excessive rate of speed independently of the transmission gearing.

Prior to this invention, motor vehicles, more particularly large delivery trucks, have been provided with worm driven differential gearing, the compensating wheels being operated by a large worm gear and a worm fitted to said worm gear. The worm is usually secured to the drive shaft which extends from the transmission gearing to a point near the rear axle. Low speed and an extremely high degree of power may be developed by the use of a driving device of this kind, but if the worm is designed to provide for the maximum power at the traction wheels, the latter will not be free to turn independently of the worm. This is due to the fact that the worm will transmit movement to the worm gear, but the latter cannot readily transmit movement to the worm. When the vehicle is coasting down a hill, and under various other conditions, the traction wheels tend to turn at an excessive rate of speed and the worm wheel then tends to turn the worm. Since movement cannot be readily transmitted from the worm wheel to the worm, the axle is subjected to very severe twisting strains, and in practice I have found that the axles of worm driven motor trucks are frequently broken by the torsional strains to which they are subjected in service. As a result of these conditions, designers of worm driven differential gearing have increased the pitch of the worm threads to such an extent that the desired increase of power cannot be obtained, but even this does not entirely eliminate the severe torsional strains at the axle.

Therefore, one of the objects of my invention is to produce a worm driven differential gearing, having a worm of any desired pitch, and means for transmitting power from said worm to the traction wheels, the elements of said means being so constructed and arranged that the traction wheels are free to turn at an excessive speed without in any way injuring the axle or worm elements, thereby entirely eliminating the severe torsional strains, and at the same time allowing the designer to provide for the desired increase in power by the use of a worm that cannot be turned by the worm wheel.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a top or plan view showing the wheels and driving mechanism of a motor vehicle constructed in accordance with the invention.

Fig. II is an enlarged horizontal section showing the differential gearing, the axle sections operable by said gearing, and a fragment of one of the traction wheels.

Fig. III is an enlarged section illustrating one of the overrunning clutches.

Fig. IV is an enlarged fragmentary section showing a portion of one of the axle sections and one of the clutch rolls secured to said axle section.

To illustrate the invention I have shown a motor M, transmission gearing T, and traction wheels W operable by said motor and transmission gearing. A shaft 1 extending from the motor may be coupled to the transmission gearing through the medium of a clutch C shown in Fig. I. The transmission gearing may be constructed in any suitable manner and I, therefore, do not deem it necessary to show or describe all of the elements of this part of the mechanism. The transmission gearing shown diagrammatically in Fig. I includes a drive wheel 2 fixed to a shaft 3, a driven shaft 4 operable by said drive wheel 2, said driven shaft being provided with suitable gear wheels as is well understood in this art. Gear wheels 5 and 6 may be shifted on the shaft 7 to provide for the transmission of power to the drive shaft 8. The reversing device includes a shifter 9 fitted to the gear wheel 5 and adapted to be operated by the usual lever 10, the latter being movable in the H-shaped slot 11 shown in Fig. I.

The rear axle preferably comprises a pair of axle sections 12 arranged in sleeves 13, the outer end of each axle section 12 being rigidly secured to one of the traction wheels W. The sleeves 13 do not turn with the axle. 14 designates a housing secured to the inner ends of the sleeves 13.

The differential gearing comprises a pair of compensating wheels 15 in the form of bevel gears, mounted on the inner end portions of the axle sections 12. Pinions 16 meshing with the compensating wheels 15 are rotatably mounted on studs 17 secured to a housing 18. This housing is rotatably mounted on the hubs of the compensating wheels 15. The pinions 16 are adapted to rotate around the axis of the studs 17, and the housing 18 which carries said studs is free to revolve around the axis of the axle sections 12. A worm gear 19, surrounding the housing 18, is secured to said housing by means of a ring 20 and screws 21 (Fig. II). The worm gear 19 meshes with a worm 22 (Fig. I), arranged in the upper portion of the housing 14 and secured to the flexible drive shaft 8.

Power is transmitted from the motor, through the transmission gearing T and drive shaft 8 to the worm 22 which turns the worm gear 19 around the axis of the axle sections 12. The housing 18, secured to the worm gear 19, carries the pinions 16 around the axis of the axle sections, thus turning the compensating wheels 15. Power is transmitted from the compensating wheels 15 to the axle sections 12 through the medium of an overrunning clutch device which allows the traction wheels and axle sections to turn at an excessive rate of speed without transmitting movement to the worm gear 19.

The overrunning clutch device comprises two overrunning clutches located at the inner end portions of the axle sections. Each of these overrunning clutches includes a series of rollers 25 arranged directly between one of the compensating wheels 15 and the axle section to which said wheel is fitted, the axle section having notches for the reception of said rollers, as shown in Figs. III and IV. Each roller 25 is arranged in a substantially V-shaped pocket formed by the groove in the axle section and the wheel 15 which surrounds said axle section. Springs 26 tend to force the rollers 25 toward the contracted portion of the V-shaped pockets, as shown in Fig. III, thereby forcing said rollers into engagement with the axle, and also into engagement with the wheel 15 which surrounds the axle. When the wheels 15 are rotated in the direction indicated by arrows in Fig. III, power is transmitted from said wheels, through the rollers 25 to the axle sections 12. It will be noted that the axle sections 12 may be turned at an excessive rate of speed in the direction indicated by arrows in Fig. III without transmitting movement to the compensating wheels 15. Therefore, the traction wheels W and axle sections 12 are free to turn at an excessive rate of speed without transmitting movement to the worm gear 19. By constructing and arranging the parts in the manner shown, the worm gearing may be designed to provide for the desired high degree of power at the traction wheels, and the axle sections 12 will not be subjected to twisting strains when the traction wheels turn at an excessive rate of speed.

The movement of the differential gearing may be reversed by shifting the reversing device associated with the transmission gearing T. However, the overrunning clutch device will not transmit a movement of this kind to the axle sections 12. To provide for the transmission of power to the axle sections 12 when the reversing device occupies its operative position, positive clutch members 30 are splined to said axle sections, and the compensating wheels 15 are provided with clutch teeth adapted to interlock with said clutch members 30. The means for shifting the clutch members 30 includes a pair of shifter arms 31, secured to vertical shafts 32, the latter being provided at their upper ends with arms 33. These arms 33 lie above the housing 14, as shown in Fig. I, and they are connected to each other by means of toggle links 34. 35 designates a connecting rod connecting the toggle links 34 to the reversing device 9. When the reversing device is shifted to its operative position, the positive clutches are shifted through the medium of the mechanism just described, so as to move the clutch members 30 into engagement with the clutch teeth on the compensating wheels 15.

The rollers 25 of each overrunning clutch are preferably secured to an axle section 12 by means of annular retaining members 36 arranged in grooves in said axle section. These annular retaining members surround the reduced ends of the rollers 25, and they prevent said rollers from dropping into the housing 14 or sleeve 36 when the axle section is applied to or removed from the machine.

When the vehicle turns a corner, one of the traction wheels W runs faster than the other, but both wheels are positively driven by the differential gearing and overrunning clutches. If the differential gearing was omitted from the driving mechanism, the overrunning clutches would not transmit power to both traction wheels in turning corners. These clutches must coöperate with the differential gearing to provide for the transmission of power to both traction wheels when one wheel turns faster than the other. However, either traction wheel is always free to revolve more rapidly than the other, and both traction wheels are free to turn faster than the differential gearing. I, therefore, obtain all of the advantages of the differential gearing, and at the same time protect the driving mechanism from injury as previously pointed out.

I claim:—

1. In a motor vehicle, driving mechanism comprising traction wheels, an axle secured to said traction wheels, differential gearing associated with said axle, and an overrunning clutch device providing for the transmission of power from said differential gearing to said axle, said axle being free to turn at a higher rate of speed than the differential gearing when the overrunning clutch device is in its operative condition, and said overrunning clutch device being free to uncouple said axle from said differential gearing when the axle turns at an excessive rate of speed thereby permitting said traction wheels and axle to turn independently of said differential gearing.

2. In a motor vehicle, driving mechanism comprising traction wheels, a sectional axle including two axle sections each of which is secured to one of said traction wheels, differential gearing associated with said axle sections and an overrunning clutch device associated with said differential gearing to provide for the transmission of power to said axle sections.

3. In a motor vehicle, driving mechanism comprising traction wheels, a sectional axle including two axle sections each of which is secured to one of said traction wheels, differential gearing associated with said axle sections and an overrunning clutch device associated with said differential gearing to provide for the transmission of power to said axle sections, said overrunning clutch device comprising two overrunning clutches through which power is transmitted to the axle sections.

4. In a motor vehicle, driving mechanism comprising traction wheels, axle sections each of which is secured to one of said traction wheels, differential gearing associated with said axle sections, a driver for said differential gearing, and an overrunning clutch device providing for the transmission of power from said driver, through the differential gearing and to the axle sections, said overrunning clutch device being effective when the speed of the differential gearing is in synchronism with the speed of said axle sections, and the elements of said overrunning clutch device being free to allow said axle sections to turn independently of said driver.

5. In a motor vehicle, driving mechanism comprising traction wheels, an axle, differential gearing associated with said axle, transmission gearing, a motor for operating said transmission gearing, an overrunning clutch device providing for the transmission of power from said transmission gearing to said axle, the elements of said overrunning clutch device being free to allow said axle to turn in one direction at an excessive rate of speed and independently of said transmission gearing, said transmission gearing being provided with a reversing device operable to reverse the movement of said differential gearing, said overrunning clutch device being ineffective during the last mentioned movement, and means, under the control of said reversing device, through which power is transmitted to said axle when the reversing device is in its operative position.

6. In a motor vehicle, driving mechanism comprising traction wheels, an axle, differential gearing associated with said axle, transmission gearing, a motor for operating said transmission gearing, an overrunning clutch device providing for the transmission of power from said transmission gearing to said axle, the elements of said overrunning clutch device being free to allow said axle to turn in one direction at an excessive rate of speed and independently of said transmission gearing, said transmission gearing being provided with a reversing device operable to reverse the movement of said differential gearing, said overrunning clutch device being ineffective during the last mentioned movement, and a positive clutch device adapted to be substituted for said overrunning clutch device, said positive clutch device being under the control of said reversing device to provide for the transmission of power to said axle when the reversing device occupies its operative position.

7. In a motor vehicle, driving mechanism comprising traction wheels, axle sections each of which is secured to one of said traction wheels, differential gearing associated with said axle sections, a transmission device for operating said differential gearing, said transmission device including a reversing device operable to reverse the movement of said differential gearing, a pair of overrunning clutches for transmitting power from said differential gearing to said axle sections, the elements of said overrunning clutches being free to allow said axle sections to turn in one direction at an excessive rate of speed and independently of said transmission gearing, and positive clutches fitted to said axle sections and adapted to be substituted for said overrunning clutches to provide for the transmission of power to said axle sections when said reversing device occupies its operative position, said positive clutches being under the control of said reversing device.

8. In a motor vehicle, driving mechanism comprising traction wheels, axle sections each of which is secured to one of said traction wheels, transmission gearing, a motor for operating said transmission gearing, and means for transmitting power from said transmission gearing to said axle sections, said means including an overrunning clutch device the elements of which are free to allow said axle sections to turn in one direction at an excessive rate of speed and independently of said transmission gearing, said transmission gearing including a reversing device operable to reverse the movement of said axle sections, said overrunning clutch device being ineffective during the last mentioned movement, and a pair of positive clutches fitted to said axle and adapted to be substituted for said overrunning clutch device, said positive clutches being under the control of said reversing device.

9. In a motor vehicle, driving mechanism comprising traction wheels, differential gearing, means for driving said differential gearing, and an overrunning clutch device providing for the transmission of power from said differential gearing to said traction wheels, said traction wheels being free to turn at a higher rate of speed than the differential gearing when the overrunning clutch device is in its operative condition, and said overrunning clutch device being free to uncouple said traction wheels from said differential gearing when the traction wheels turn at an excessive rate of speed thereby permitting said traction wheels to turn independently of said differential gearing.

CHARLES F. FELTZ.